United States Patent Office 3,368,678
Patented Feb. 13, 1968

3,368,678
PURIFICATION OF DRY CLEANING SOLVENTS
Herman Spencer Gilbert, Angleton, Tex., assignor to The Dow Chemical Company, Midland, Mich., a corporation of Delaware
No Drawing. Filed Jan. 11, 1965, Ser. No. 424,830
3 Claims. (Cl. 210—75)

ABSTRACT OF THE DISCLOSURE

A process of filtering a dry cleaning solvent which comprises passing the solvent through a layer of an anionic-type filter aid having an adherent, water-insoluble coating of a normally water-soluble, organic, resinous, cationic polymer.

---

This invention relates to the removal of impurities from dry cleaning solvents and comprises an improved method for effecting filtration-removal of dispersed and suspended impurities present in dry cleaning solvents as a result of solvent contact with contaminated materials. More specifically, the present invention concerns an improved method for purification of dry cleaning solvents involving the use of normally water-soluble, organic, resinous, cationic, polymer materials for treatment of the filter media commonly employed in dry cleaning operations.

In commercial dry cleaning praxis a major cost factor is determined by the amount of contaminated material which can be cleaned by use of a given quantity of solvent. Due to the rapid build-up of impurities during repeated cleaning operations, the solvent must be continually or periodically filtered and/or distilled in order to maintain cleaning efficiency of the solvent. Continued cleaning efficiency would otherwise require relatively rapid replacement of the solvent employed in the dry cleaning system.

Filtration is usually accomplished as one of the series of successive steps or operations utilized in a complete dry cleaning process. This complete process will be referred to herein as a "cleaning cycle." A distillation operation is sometimes conducted on a portion of the solvent which has been removed from the dry cleaning system with the purified solvent being returned to the system.

In self-service, coin operated, dry cleaning systems, it is customary to depend entirely upon a filtration operation to remove impurities and maintain cleaning efficiency of the solvent. This operation is accomplished by including a filter unit in each dry cleaning machine or, alternatively, by use of a correspondingly larger filtration unit designed to service a number of machines simultaneously and thereby functioning as an integral part of the several cleaning cycles.

In the various filtration units employed, the solvent is generally passed through a quantity of "filter aid" media forming a layer or bed (hereinafter referred to as a "filter cake") which is supported on a permeable septum. The term "filter aid" will be used herein to designate any one or more of a wide variety of well known materials employed in particulate form for filtration purposes, e.g. diatomaceous earth, perlite, charcoal, etc., which are characterized by an electronegatively charged surface and sometimes referred to as "anionic-type" filter aids.

Passage of impure solvent through a filter cake results in a gradually increasing pressure differential between the solvent entry and exit faces of the filter cake. This is due to the blocking of passages or channels of flow by an accumulation of removed contaminants which is largely localized on and near the solvent entry face. Since the efficiency and economy of the dry cleaning process decreases with an increase in this pressure differential, it is common practice to periodically displace and mix, i.e. "reshuffle," the filter aid which is then redeposited on the septum. This reshuffle counteracts the localized build-up of impurities and provides new flow channels thus lowering the pressure differential, between the entry and exit faces of the filter cake, existing prior to the reshuffle operation. The pressure differential again increases with continued passage of contaminated solvent through the filter cake and the reshuffle operation may be repeated a number of times until the filter cake becomes rather uniformly saturated with removed impurities. With each reshuffle operation the drop in the previously built up pressure differential becomes smaller and theoretically when the filter cake becomes saturated it must be replaced by fresh filter aid although efficient practice dictates replacement prior to this saturation point.

An important consideration in dry cleaning operations is the "life" of the filter aid, i.e. the amount of impurities which a given quantity of filter aid can remove. This is a very important factor in both the economy and performance efficiency of a dry cleaning operation. For these reasons it is desirable to minimize the rate of pressure build-up and to maximize the drop in pressure differential resulting from each reshuffle operation while maintaining or improving the efficiency of impurity removal in order to extend the filter aid life.

In accordance with the method of the present invention, the efficiency of filtration-removal of impurities and the length of filter aid life are improved by the treatment of the filter aid with normally water-soluble, organic, resinous, cationic polymer materials.

In the general method of the present invention an anionic-type filter aid to be utilized in the dry cleaning system is treated with the cationic polymer material to provide a coated filter aid product. The cationic polymer employed in this treatment forms a relatively thin, adherent surface coating on the anionic-type filter aid. Although the cationic polymer utilized is water-soluble under normal circumstances, the coating layer, which is deposited on the filter aid from an aqueous solution of the polymer, is not removed by subsequent contact with water as, for example, the small amounts present in the dry cleaning solvents as formulated and/or as a result of cleaning moisture-containing materials. Both the polymer and the polymer coating are insoluble in dry cleaning solvents. The coating of the filter aid with cationic polymer is advantageously accomplished by spraying the filter aid with a dilute, aqueous solution of the cationic polymer or by addition of the polymer to an aqueous slurry of the filter aid followed by dewatering and drying of the resulting coated filter aid. Although the polymers employed are insoluble in the chlorinated hydrocarbon solvents generally used in dry cleaning systems, the polymer can be utilized as an additive to dry cleaning solvents where small quantities of water are tolerated in the solvent system. Due to the small amount of polymer needed to advantageously coat the filter aid it is possible to achieve improved filtration performance through this latter method of contacting the filter aid with small amounts of polymer dissolved in water present in solvent passing through the filter cake.

Polymers suitable for use in coating filter aids for use in accordance with the method of the present invention are those normally water-soluble, organic, resinous, polymers and copolymers having a multiplicity of cationic sites in the molecule, e.g. polyalkylenepolyamine, polyalkylenimines, polyvinylbenzyl tertiary amines, polyvinylbenzyl quaternary ammonium salts, vinylbenzylsulfonium polymers, etc., and copolymers thereof. Polymer materials having the most strongly cationic groups such as the "onium" groups are preferred, e.g. ammonium, phosphonium and sulfonium groups.

Cationic organic polymers which are especially efficacious for use in coating filter aids are those prepared by the polymerization of alkylenimines, e.g. ethylenimine, to form polyalkylenimines, and by the condensation reaction of dihaloalkanes with polyalkylenepolyamines, e.g. ethylene dichloride and triethylenetetraamine, to form polymeric polyalkylenepolyamines. These polymers possess a high ratio of cationic charge sites to molecular weight which furnishes a large number of sites available to attract negative charge bearing impurities over and above those cationic sites which are neutralized by the anionic-type filter aid in the coating process.

A concentration of from about 1 to 15 weight percent of the polymer in aqueous solution is preferably employed to slurry or spray-treat the anionic filter aid. From about 0.05 to 0.5 weight percent of the coated filter aid product consists of the polymer which forms an adherent surface layer bonded to the filter aid by the attraction of the oppositely charged materials.

The following examples describe completely representative specific embodiments and the best mode contemplated by the inventors of carrying out the invention. These examples, however, are not to be interpreted as limiting the invention other than as defined in the claims.

Example 1

A quantity of 12 g. of diatomaceous earth having a median particle size of 11–12 microns was mixed with 4 g. of activated charcoal and 4 g. of activated clay. This 20 g. mixture was then slurried with 800 ml. of perchloroethylene containing 7.5 g. of a petroleum sulfonate, approximately 0.26 g. of water and approximately 0.58 g. of a water-soluble polyethylenepolyamine having a molecular weight of more than 10,000. The cationic polymer-coated filter aid resulting from this treatment was then formed into a filter cake on a 1.5 inch internal diameter filter screen.

A similar filter cake was prepared by the above procedure but omitting the cationic polymer to prepare a control filter cake employed to establish the effects of polymer treatment of the filter cake on filtration rates.

The filter cake was sealed to the bottom of a vertical glass column (1.5 inch I.D.) and connected at the solvent exit face to a closed receiver attached to a vacuum pump. The pressure on the solvent entry face of the filter cake during filtration was equal to atmospheric pressure plus the weight of the column of contaminated solvent to be filtered. A pressure of 100 mm. Hg was maintained at the solvent exit face of the filter cake.

A contaminated solvent was prepared by thoroughly mixing 200 g. of filter muck from a local dry cleaning plant with 2 gals of perchloroethylene solvent, allowing the mixture to stand overnight and siphoning the supernatant liquid off for use in the filtration runs of this example.

Table I, below, shows the filtration data resulting from use of the polymer treated and control filter cakes. In each case the first column indicates the total volume of contaminated solvent filtered, the second column indicates the total time in seconds required to filter the total volume indicated in the first column (less the first 400 ml. filtered), the third column indicates the rate of filtration in mls./min. for the preceding 50 mls. of contaminated solvent filtered. The single column on the right shows the percent improvement in filtration rate of each 50 ml. increment of contaminated solvent filtered.

TABLE I

| Untreated Filter | | | Treated Filter | | | Percent Rate Improvement |
|---|---|---|---|---|---|---|
| Vol. (mls.) | Time (sec.) | Rate (mls./min.) | Vol. (mls.) | Time (sec.) | Rate (mls./min.) | |
| 400 | | | 400 | | | |
| 450 | 55 | 54.5 | 450 | 44 | 68.2 | 25.1 |
| 500 | 108 | 56.6 | 500 | 87 | 69.7 | 23.2 |
| 550 | 163 | 54.5 | 550 | 130 | 69.7 | 27.9 |
| 600 | 219 | 53.6 | 600 | 174 | 68.2 | 27.2 |
| 650 | 276 | 52.6 | 650 | 219 | 66.7 | 26.8 |
| 700 | 334 | 51.7 | 700 | 265 | 65.2 | 26.1 |
| 750 | 392 | 51.7 | 750 | 310 | 66.7 | 29.0 |
| 800 | 450 | 51.7 | 800 | 356 | 65.2 | 26.1 |

In an otherwise identical experiment, substitution of polymerized vinylbenzyltrimethylammonium chloride for the polyethylenepolyamine employed above resulted in an average filtration rate improvement of 20 percent over the rate obtained when employing an untreated filter cake. Likewise, normally water-soluble polymers of other polyalkylenepolyamines, polyalkylenimines, polyvinylbenzyl tertiary amines, polyvinylbenzyl quaternary ammonium salts and vinylbenzylsulfonium polymers are employed in the above procedure in place of polyethylenepolyamine with similarly advantageous results.

Example 2

The following experiment demonstrates the improvement in the amount of contaminated solvent which can be effectively filtered through a filter cake prepared from filter aids treated with the previously discussed polymers as compared with use of untreated filter aids. The experiment also demonstrates the improvement in the pressure differential drop when treated filter aid cakes are reshuffled as compared to the results with untreated filter aids.

The treated filter aid material employed was prepared by spraying an aqueous solution of the polyethylenepolyamine polymer described in Example 1 onto a quantity of continuously tumbled diatomaceous earth having a median particle size of 11–12 microns. The thus treated filter aid was then air-dried and employed to prepare a filter cake. A control filter cake, similar in every respect except omitting the polymer treatment, was used in an identical run.

A standard soiled solvent was run through the filter cakes in each experiment and the data in Table II, below, show the results obtained. In each case a standard apparatus was employed to pump the soiled solvent through the filter cake. The pressure at the solvent entry face of the filter cake in each run was initially equal to about 2.2 p.s.i. and as soiled solvent was filtered this pressure gradually increased to a solvent entry face pressure of approximately 15 p.s.i. due to the previously discussed localized build-up of impurities on and in the filter cake. When this upper pressure was reached, the apparatus pump was shut down, marking the end of the first "cycle," the filter cake was reshuffled, reformed on the septum and the filtration of soiled solvent then continued until the pressure again reached 15 p.s.i. marking the end of the 2nd "cycle." This reshuffling operation, which is a standard operation in dry cleaning practice and well known in the art, was repeated several times. At the end of four "cycles," the treated filter aid cake had filtered 16 percent more soiled solvent than the untreated filter aid cake and a subsequent reshuffle operation after the completion of the fourth cycle showed a significantly greater pressure drop as shown in the data in Table II, below.

TABLE II

| Cycle | Untreated filter | | Treated filter | |
| --- | --- | --- | --- | --- |
| | Pressure (p.s.i.) | Time to Reach 15 p.s.i. | Pressure (p.s.i.) | Time to Reach 15 p.s.i. and |
| 1st | 2.2 (beginning) | 8 min | 2.2 (beginning) | 8 min. |
| 2nd | 3.9 (after 1st reshuffle) | 8 min | 3.8 (after 1st reshuffle) | 8 min. |
| 3rd | 7.4 (after 2nd reshuffle) | 6 min | 5.4 (after 2nd reshuffle) | 7 min. |
| 4th | 11.3 (after 3rd reshuffle) | 3 min | 7.6 (after 3rd reshuffle) | 6 min. |
| 5th | 13.3 (after 4th reshuffle) | | 10.8 (after 4th reshuffle) | |

*Example 3*

In an experiment similar to that above, a series of four cycles (a filter-reshuffle operation equals one cycle) was run using an untreated filter aid cake. At the end of this series the average filter pressure at the solvent entry face of the filter cake was 13.9 p.s.i. after the last reshuffle. Upon addition of 300 ml. of fresh perchloroethylene dry cleaning formulation saturated with the polyethylenepolyamine polymer of Example 1, the pressure upon reshuffling dropped almost immediately from the 13.9 p.s.i. average to 7.9 p.s.i. average; a pressure decrease of almost 30 percent.

I claim:

1. A method for improving the rate and efficiency of filtration-removal of impurities present in contaminated dry cleaning solvent which comprises the step of passing said contaminated solvent through an anionic-type filter aid having an adherent, water-insoluble coating of a normally water-soluble, organic, resinous, cationic polymer.

2. In a method for purifying contaminated dry cleaning solvent by passing said contaminated solvent through particulate filter aid material during a cleaning cycle, the improvement which comprises employing an anionic-type filter aid having an adherent water-insoluble coating of a normally water-soluble, organic, resinous, cationic polymer selected from the group consisting of polyalkylenimines, polyalkylenepolyamines, polyvinylbenzyltertiary amines, polyvinylbenzyl quaternary ammonium salts and polyvinylbenzylsulfonium polymers.

3. The method of claim 1 wherein said polymer is a polyethylenepolyamine having a molecular weight greater than about 10,000.

References Cited

UNITED STATES PATENTS 3,215,278  11/1965  Owens et al. _____ 8—142 X
3,242,073  3/1966  Guebert et al. _____ 210—75 X SAMIH N. ZAHARNA, *Primary Examiner.*

MORRIS O. WOLK, *Examiner.*

E. G. WHITBY, *Assistant Examiner.*